UNITED STATES PATENT OFFICE.

JOHN H. RYAN, OF CHICAGO, ILLINOIS, ASSIGNOR TO DUNCAN R. SEAMAN, OF CHICAGO, ILLINOIS.

PROCESS OF GRINDING CALCIUM CARBONATE AND PRODUCT THEREOF.

1,328,299.      Specification of Letters Patent.      Patented Jan. 20, 1920.

No Drawing.      Application filed March 24, 1919. Serial No. 284,602.

*To all whom it may concern:*

Be it known that I, JOHN H. RYAN, a citizen of the United States, residing in the city of Chicago, county of Cook, and State of Illinois, have invented certain new and useful Improvements in Processes of Grinding Calcium Carbonate and Product Thereof, of which the following is a specification.

This invention relates to a process of grinding calcium carbonate and product thereof and refers more particularly to the reducing of calcium carbonate to amorphous condition or impalpable powder.

Calcium carbonate in amorphous condition is used largely in the arts, as for example, as whiting in the making of calcimine, paint filler, putty, moldings and the like. The calcium rock ($CaCO_3$) invariably has a crystalline structure, but in certain natural deposits is amorphous rendering it more dense and opaque.

The salient object of the present invention is to reduce the entire crystalline structure of this calcium carbonate to amorphous condition by mechanically grinding in the presence of water. By this invention I am able to accomplish in a relatively few hours the same action that it takes nature centuries to do. I wish to emphasize the fact that I reduce not a portion of the crystalline structure of this calcium carbonate to impalpable powder but all of it.

Describing first the preliminary treatment of the rock, it can be first crushed in any suitable rock breaker or crushers by the well known methods, down to relatively small pieces. These small pieces are first introduced to rolls or other suitable mechanism for finer reduction, say to approximately 200 mesh. The product however, is yet much too coarse for the purposes above referred to, as for example, to be used as whiting. In the present practice of reducing this calcium carbonate, the well known flotation method is commercially used but this flotation method does not by any means reduce all of the crystalline structure to impalpable powder. Moreover, it is impossible in commercial practice to entirely separate by the flotation method all of the coarser particles from the finest products. This naturally results from the fact that the agitating effect of the water carrying the ground product with a large part of that product of the finer particles will also carry a certain percentage of the various sizes of coarser product along with it, due to the fact that the movement of the water with the finer particles in suspension has a buoyant action on the coarser and heavier particles and carries a portion of them along from cell to cell. Even with the large number of cells, the very fine particles cannot be entirely freed from the coarser or heavier material. It is also to be noted that this flotation process takes a relatively long period of time and necessitates more or less expensive mechanism.

The difficulties of the flotation process are entirely obviated in the present invention. After the calcium carbonate has been reduced to the fineness of say approximately 200 mesh in the manner heretofore described it is introduced to a pebble mill with water in approximately the following proportions say 100 parts calcium carbonate and 50 parts of water. The mill is then rotated. As the rotation of the mill proceeds the very fine particles contained in the calcium carbonate begin to effectively emulsify with the water. With the continued rotation of the mill more of the crystalline calcium is broken down, the emulsion thickens and in a relatively short time the emulsion is sufficiently plastic to carry all the remaining coarser particles in suspension, and thereby securing a greater attrition or grinding action between the coarser particles and pebbles. The plasticity of this mass is an essential feature in the reduction of the coarser particles to amorphous condition. If there is an excess of water the larger and coarser crystalline particles will float in the water through the interstices between the pebbles and will not become effectively crushed. In other words, this plastic mass should be of a syrupy consistency so as to hold the coarser particles sufficiently to insure of their being passed between the pebbles and being gradually reduced to amorphous powder. If there is not a sufficient quantity of water then when breaking down of the crystalline particles is well under way, the emulsion or plastic mass will become so thick that it would stick and cake to the sides of the mill and prevent further reduction. This agglomeration of the mass is to be carefully avoided. I have ascertained from practice covering an extended period of time that approximately the only way in which the calcium carbonate can be entirely reduced to amorphous condition or product is in the manner set forth. The percentage of water can not be substantially varied although it is to be understood of course that slight variations may accomplish the same results although perhaps in a longer period of time, also the character of the calcium carbonate might be such as to permit of certain variations in the percentage of water. It is to be clearly understood that the percentage of water must be such as to produce the plastic mass referred to, and either too little water or an excess of water will defeat the purpose of the invention. It is further to be understood that the very fine particles of material which are themselves substantially amorphous are more or less of a colloidal character and act in effect as an emulsifying agent.

I claim as my invention:

1. A process of reducing calcium carbonate previously crushed or in a relatively fine condition to amorphous powder consisting in mixing the material in batches with sufficient amount of water to cause in effect an emulsifying action between the water and the very fine substantially amorphous particles contained in the calcium carbonate to form a plastic mass of the batch, hold the coarser particles in suspension throughout said plastic mass and simultaneously subjecting them to a grinding action to rapidly reduce all of said coarse particles to an impalpable powder.

2. A process of reducing calcium carbonate previously crushed or in relatively fine condition to an impalpable powder, consisting in mixing in a batch substantially one hundred parts calcium carbonate with fifty parts of water, forming in effect an emulsion between the water and the very finest particles of calcium carbonate to form a plastic mass of such a consistency as to hold the coarser particles in suspension throughout the plastic mass and simultaneously subjecting them to a grinding action to reduce all of said coarser particles to the condition of impalpable powder.

3. A process of reducing calcium carbonate entirely to substantially impalpable powder, consisting in forming an emulsion with water and an emulsifying agent of the colloidal character naturally contained in the calcium carbonate, holding the coarser particles in suspension in a batch under treatment in the emulsion and subjecting them to the grinding action to reduce all the particles to amorphous condition.

JOHN H. RYAN.